(12) United States Patent
Goisser et al.

(10) Patent No.: US 12,178,670 B2
(45) Date of Patent: Dec. 31, 2024

(54) DENTAL TURBINE

(71) Applicants: DENTSPLY SIRONA INC.; SIRONA DENTAL SYSTEMS GMBH, Bensheim (DE)

(72) Inventors: Siegfried Goisser, Einhausen (DE); Stefan Göbel, Langen (DE)

(73) Assignee: Dentsply Sirona Inc., York, PA (US)

( * ) Notice: Subject to any disclaimer, the term of this patent is extended or adjusted under 35 U.S.C. 154(b) by 693 days.

(21) Appl. No.: 17/292,823

(22) PCT Filed: Nov. 13, 2019

(86) PCT No.: PCT/EP2019/081230
§ 371 (c)(1),
(2) Date: May 11, 2021

(87) PCT Pub. No.: WO2020/099512
PCT Pub. Date: May 22, 2020

(65) Prior Publication Data
US 2021/0393369 A1 Dec. 23, 2021

(30) Foreign Application Priority Data
Nov. 16, 2018 (EP) ..................... 18206723

(51) Int. Cl.
*A61C 1/05* (2006.01)
*A61C 1/18* (2006.01)
(52) U.S. Cl.
CPC .............. *A61C 1/057* (2013.01); *A61C 1/181* (2013.01)
(58) Field of Classification Search
CPC ............ A61C 1/05; A61C 1/052; A61C 1/057
See application file for complete search history.

(56) References Cited

U.S. PATENT DOCUMENTS

| 3,092,908 A | * | 6/1963 | Flatland | ................... A61C 1/05 415/111 |
| 3,962,789 A | * | 6/1976 | Flatland | ................. A61C 1/181 433/132 |

(Continued)

FOREIGN PATENT DOCUMENTS

| CN | 204437065 U | * | 7/2015 | ............... A61C 1/05 |
| DE | 4320532 C1 | | 9/1994 | |

(Continued)

OTHER PUBLICATIONS

Translation of CN204437065 (Year: 2015).*
(Continued)

*Primary Examiner* — Heidi M Eide
*Assistant Examiner* — Shannel Nicole Belk
(74) *Attorney, Agent, or Firm* — SCHWEGMAN LUNDBERG & WOESSNER, P.A.

(57) ABSTRACT

A dental turbine driven by pressurized air comprises a head housing (1) with a turbine chamber (2) and a rotor shaft (3) mounted using an anti-friction bearing (8*a*) with a non-rotatably mounted turbine wheel (13). The outer race (10*a*) of the anti-friction bearing (8*a*) extends into the turbine chamber (2) in axial direction. The turbine wheel (13) comprises an annular web (16*a*) that is arranged concentrically to the outer race (10*a*) of the anti-friction bearing (8*a*) and, together with the outer race (10*a*), forms a gap seal (17*a*). This gap seal (17*a*) extends in axial direction between outer race (10*a*) and annular web (16*a*) and prevents the sucking-in of liquids and dirt particles into the turbine chamber (2) during inertial rotation of the turbine wheel (13).

9 Claims, 4 Drawing Sheets

(56) References Cited

U.S. PATENT DOCUMENTS

Figure 1A:
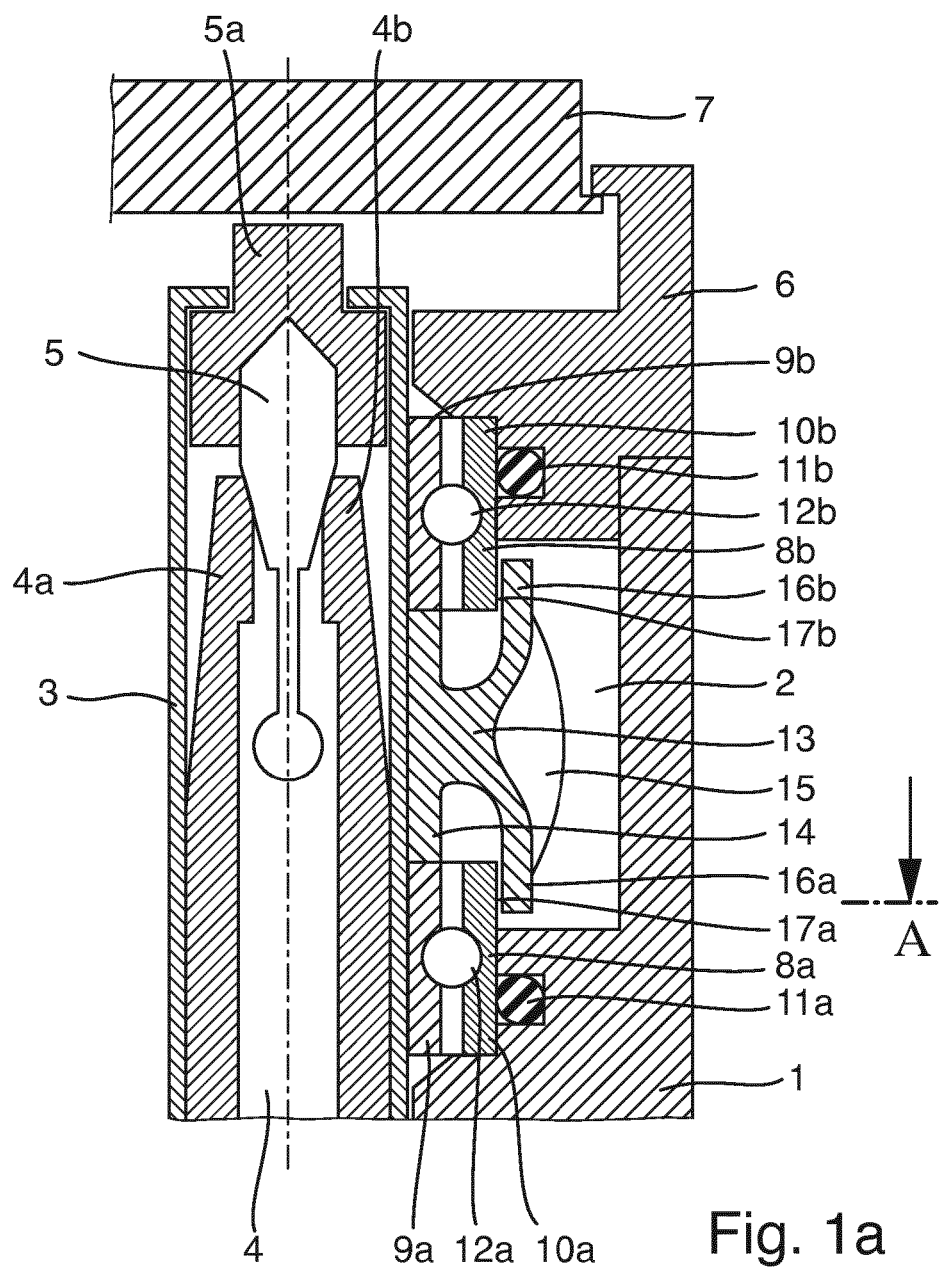

| | | | |
|---|---|---|---|
| 4,021,919 A * | 5/1977 | Lingenhole | A61C 1/18 |
| | | | 433/101 |
| 4,341,520 A | 7/1982 | Wallace | |
| 5,423,678 A | 6/1995 | Nakanishi | |
| 5,779,474 A * | 7/1998 | Gonser | A61C 1/057 |
| | | | 433/132 |
| 2014/0038123 A1* | 2/2014 | Zhang | A61C 1/088 |
| | | | 433/29 |

FOREIGN PATENT DOCUMENTS

| | | | | |
|---|---|---|---|---|
| DE | 19529668 A1 | 2/1997 | | |
| DE | 112006000658 T5 | 2/2008 | | |
| EP | 0758540 A2 | 2/1997 | | |
| EP | 0974308 A1 | 1/2000 | | |
| EP | 2874558 A1 | 5/2015 | | |
| WO | WO-0101879 A1 * | 1/2001 | | A61C 1/05 |
| WO | 2006101133 A1 | 9/2006 | | |
| WO | 2014012958 A1 | 1/2014 | | |

OTHER PUBLICATIONS

International Search Report; PCT/EP2019/081230; Jan. 21, 2020 (completed); Jan. 29, 2020 (mailed).
International Preliminary Report on Patentability; PCT/EP2019/081230; Jan. 21, 2020 (completed); Jan. 29, 2020 (mailed).
Written Opinion of the International Searching Authority; PCT/EP2019/081230; Jan. 21, 2020 (completed); Jan. 29, 2020 (mailed).

* cited by examiner

DENTAL TURBINE

RELATED APPLICATIONS

This application claims priority to pending application WO2020/0099512A filed on Nov. 13, 2019, which in turn claims priority to pending application EP 18206723.1 filed on Nov. 16, 2018.

FIELD OF THE INVENTION

The invention relates to a dental turbine for driving a dental preparation tool by pressurized air.

BACKGROUND OF THE INVENTION

A dental turbine is known, for example, from the applicant's European patent 2 874 558. In a head housing, a turbine chamber is arranged and a rotor shaft is rotatably mounted using roller bearings. The rotor shaft comprises a receptacle for receiving a preparation tool such as a dental drill or bur for working on cavities or crowns. A turbine wheel arranged in the turbine chamber is non-rotatably mounted to the rotor shaft. The turbine chamber further comprises an inlet and an outlet for the pressurized air driving the turbine wheel.

The turbine chamber needs to be sealed off as well as possible against the rotor shaft. The uncontrolled discharging of pressurized air during operation is thus prevented. It is even more important that no contaminated liquids, such as saliva or blood and/or other contaminants such as debris from the tooth worked on, are sucked into the inside of the turbine chamber after the pressurized air supply has been switched off, because the turbine wheel, which, due to its inertia, keeps running after switch-off, temporarily causes a vacuum in the turbine chamber.

DE 43 20 532 C1 discloses a dental turbine drive with an automatic speed control as a function of load changes. An adjustment means is arranged in the outlet channel between rotor disc and rotor disc housing, the cross-section of the outlet channel being limited by the adjustment means and an annular housing wall. The adjustment means is configured such that, due to rotational forces, it changes its form and/or position during rotation of the rotor disc in such a manner that the effective cross-sectional area decreases with increasing rotational speed and increases with decreasing rotational speed.

EP 0 974 308 A1 describes a turbine handpiece having a means which prevents a release of pressurized air through the discharge line after the pressure medium supply has been switched off and while the turbine wheel keeps running on. Thereby, no pump function and thus no vacuum can be generated in the turbine chamber even when the turbine wheel keeps running on after the pressure medium supply has been switched off. A sucking-in or suckingback is thus prevented.

DE 11 2006 000 658 T5 and the corresponding document WO 2006/101133 describe a handpiece and a method for preventing a suckingback, comprising a buffer chamber defined in the head, where air is forced in due to centrifugal forces, a channel for discharging the accumulated air to the atmosphere and comprising a circumferential wall mounted between the outlet and the turbine wheel for providing a resistance to the air moving from the wheel toward the outlet. It shall thus be achieved that during the inertial rotations of the wheel after supply of the driving air has been halted, no contaminations are drawn into the interior of the handpiece.

DE 195 29 668 A1 discloses a dental turbine handpiece comprising a valve arranged in the discharge line. The valve is controllable such that it closes in dependence upon the pressure, the flow speed or the flow amount in the discharge line. The sucking-back effect shall thus be reduced.

Another simple way to sufficiently separate the turbine chamber and the following backflow channel from the rotor shaft is to provide a wall on the casing of the handpiece. However, such a separation demands quite a lot of space and particular precision during manufacturing.

SUMMARY OF THE INVENTION

Thus, the technical problem addressed is the effective prevention of a sucking-in of liquids and debris during inertial rotation of the rotor in a simple manner that allows for cost-efficient manufacturing and operation.

With a dental turbine according to the preamble of the first patent claim, this object is achieved by the outer race of the anti-friction bearing of the rotor shaft extending into the turbine chamber in axial direction and by an annular web being non-rotatably fixed to the rotor shaft and being arranged concentrically to the outer race of the anti-friction bearing. The annular web and the outer race together form a gap seal. The object is further achieved by a dental preparation instrument as claimed herein.

The gap seal according to the invention, formed by annular web and outer race, highly efficiently separates the flow zone of the turbine chamber from the rotating rotor shaft by opposing the suction power of the turbine wheel in inertial rotation with a comparatively high flow resistance. The configuration of the (dental) turbine for a dental preparation instrument according to the invention therefore reduces undesirable sucking-in of fluids and dirt particles up to the limit of detection.

The gap seal according to the invention between turbine chamber and rotor shaft is formed by means of the concentric annular web. The opposite side of the gap is formed by the outer race of the present anti-friction bearing. As the seal is a non-contacting seal, no wearing occurs. The fact that only a small space is needed is a further advantage.

The annular web may, as a separate part, be arranged directly at the rotor shaft and non-rotatably mounted thereto. Non-rotatably mounted means that the web is torque-proof relative to the rotor shaft and fixed in a circumferential position. A shift of the web relative to the shaft in an axial direction would be allowed. Preferably, the annular web is fixed on the rotor shaft. Alternatively, the annular web may be arranged at the inner race of the anti-friction bearing or may be integrally formed therewith. It may also be integrally formed with the rotor shaft.

Preferably, the annular web is arranged concentrically around the outer race of the anti-friction bearing. Preferably, the gap seal extends in axial direction between the outer race and the annular web. Thus, an axial overlapping of the annular web with the portion of the outer race that extends into the turbine chamber results. The gap seal extends over the area of this overlap. Thus, a particularly low construction height, i.e. axial length, of the dental turbine results.

In a preferred embodiment, the turbine wheel comprises the annular web. The web is preferably non-rotatably mounted thereon, particularly preferably fixed thereon. Advantageously, the annular web that forms the gap seal is integrally formed with the turbine wheel. Not a single additional component is necessary for the creation of the gap seal between turbine chamber and rotor shaft; the concentric annular web merely needs to be integrally formed with the turbine wheel. The annular web preferably forms a kind of collar at the hub of the turbine wheel, which collar axially overlaps the outer race of the anti-friction bearing. Preferably, the annular web is arranged coaxially to the rotor shaft in circumferential direction.

For reaching an optimal sealing effect it has proven advantageous if the axial length of the gap seal is multiple times larger than the radial distance between the annular web and the outer race of the anti-friction bearing. Since the turbine wheel slows down relatively quickly after the pressurized air supply has been switched off, i.e. when the wheel is running idle, the axial length of the gap seal, i.e. the area where annular web and outer race overlap, does not have to be very large to create the flow resistance necessary for an effective sealing. A radial distance between annular web and outer race between 0.05 mm and 0.3 mm, preferably at an axial length of the gap seal between 0.1 mm and 2.0 mm, has proven to be sufficient and advantageous. Particularly advantageous is a radial distance between annular web and outer race of at most 0.2 mm, further preferably of at most 0.1 mm, preferably in combination with an axial length of the gap seal of at least 0.2 mm.

In a particularly preferred embodiment of the dental turbine according to the invention, the rotor shaft with the non-rotatably mounted turbine wheel is mounted in the head housing using two coaxial anti-friction bearings, wherein the two anti-friction bearings are arranged at an axial distance from one another. The outer races of the two anti-friction bearings then extend, preferably mirror-symmetrically, in axial direction and at opposite sides into the turbine chamber, preferably facing each other. The turbine wheel is arranged in between the two anti-friction bearings and preferably has two annular webs that are positioned axially opposite one another. Preferably, the two annular webs are arranged concentrically to the respective outer races of the anti-friction bearings and each form a gap seal together with the respective adjacent outer race. This allows for a sealing of the rotor shaft at both ends opposite the turbine chamber without additional components such as a wall or a radial seal ring.

Of course, embodiments are also conceivable in which an upper and a lower anti-friction bearing is provided, but which comprise an arrangement and gap seal according to the invention only at one anti-friction bearing. For example, the annular web that is arranged concentrically to the outer race could be provided at the lower anti-friction bearing, while a corresponding seal against sucking-in of undesired fluids, for example by a web or projection provided at a cover, retaining ring or housing part of the handpiece, could be provided at the upper anti-friction bearing.

Alternatively or additionally to the providing of an axial gap seal between outer race and annular web, the gap seal may also extend in radial direction. In this case, the free top side of the outer race completely or partly forms a wall of the gap seal.

Hereinafter, two exemplary embodiments of the invention are described with reference to the enclosed Figures. In the Figures.

DESCRIPTION OF THE DRAWING FIGURES

Figure 1B:
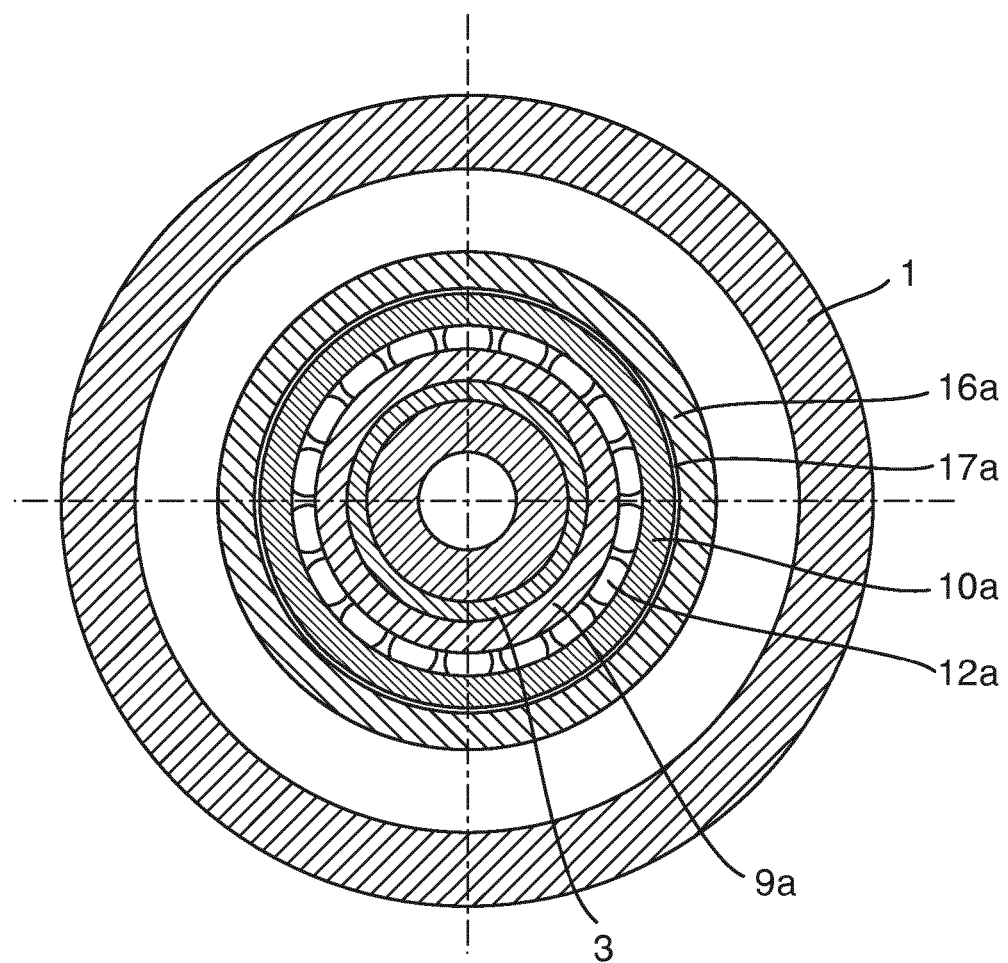
Figure 2:
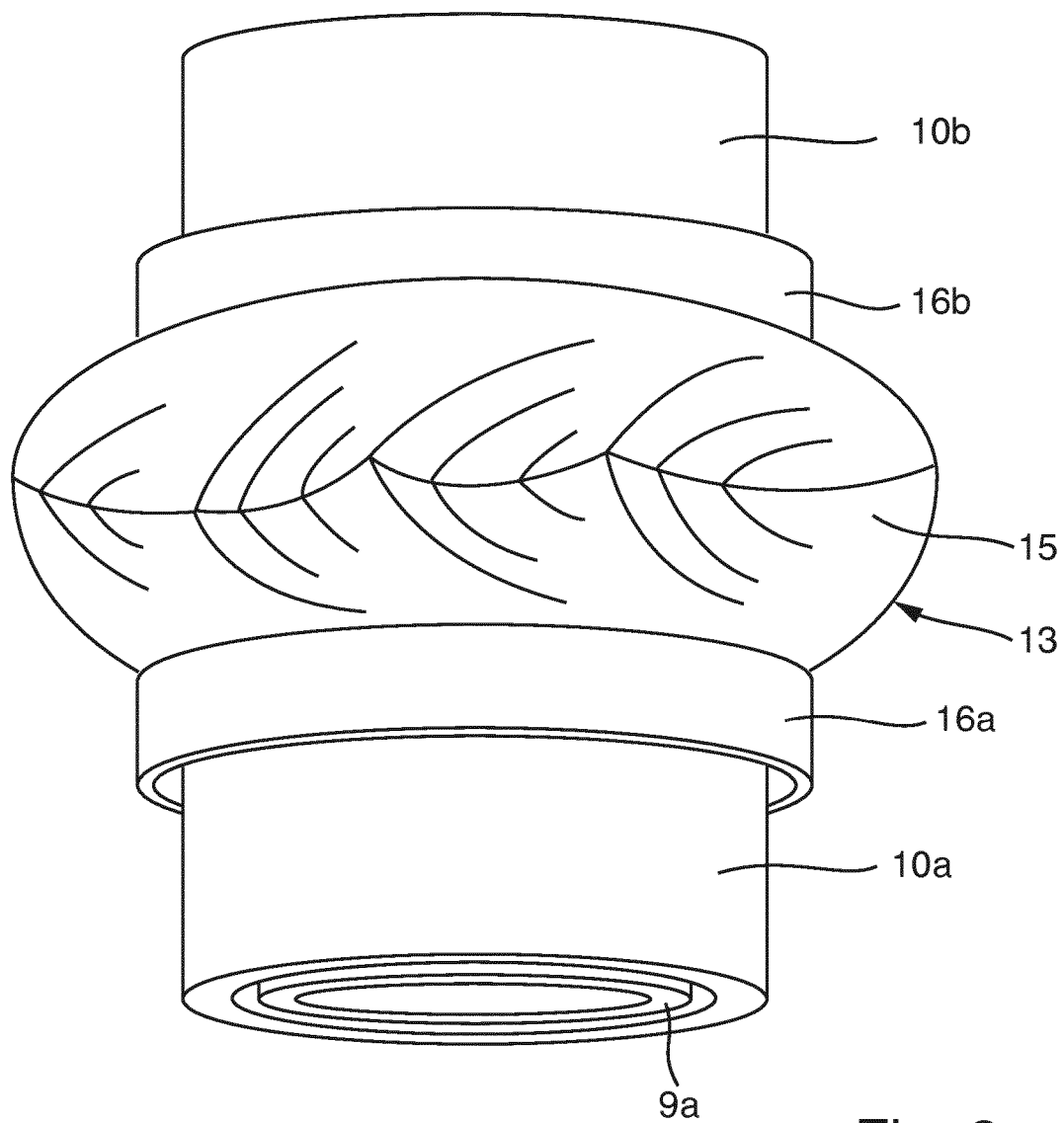
Figure 3:
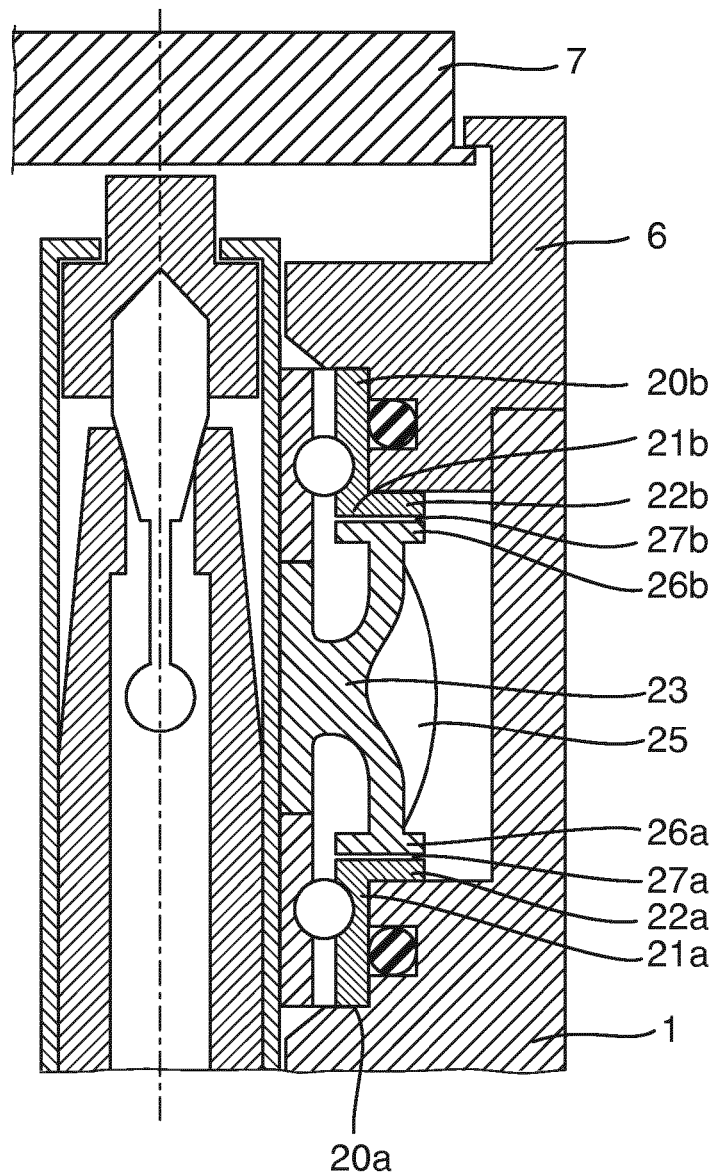

FIG. 1a shows a dental turbine, in a vertical cross section;
FIG. 1b shows a horizontal cross-section along the line A-A in FIG. 1a;
FIG. 2 shows the anti-friction bearings and the turbine wheel of the dental turbine according to FIG. 1a, in a perspective view;
FIG. 3 shows an alternative embodiment of a dental turbine, in a vertical cross section.

DESCRIPTION OF THE PREFERRED EMBODIMENTS

The dental turbine shown in FIG. 1 has a cylindrical head housing 1, inside of which a circular turbine chamber 2 is arranged. A hollow rotor shaft 3 is rotatably mounted around the vertical axis in the head housing 1. The rotor shaft 3 is open at its lower end and comprises a chuck 4 for receiving a preparation tool (not shown), said chuck 4 comprising annular clamping jaws 4a, 4b. An axially movable plunger 5 is arranged at the upper end of the rotor shaft 3. The tappet 5 extends into the clamping jaws 4a, 4b and can push them apart to release the preparation tool. A tappet holder 5a arranged at the upper end of the tappet 5 protrudes from the rotor shaft 3. A retaining ring 6 on the head housing 1 is arranged concentrically around the rotor shaft 3. A pressing lid 7, which is mounted in the retaining ring 6 so that it is axially movable, caps the dental turbine at its upper end. Pressing lid 7, tappet holder 5a, tappet 5, and clamping jaws 4a, 4b serve to unlock the preparation tool (not shown) to release it from the rotor shaft 3.

The rotor shaft 3 is mounted in the head housing 1 using two anti-friction bearings 8a, 8b, wherein the two anti-friction bearings 8a, 8b are arranged at an axial distance to one another. Inner races 9a, 9b of the anti-friction bearings 8a, 8b are non-rotatably mounted to and fixed on the rotor shaft 3. Outer races 10a, 10b of the anti-friction bearings 8a, 8b are non-rotatably mounted to the head housing 1, preferably fixed to the housing 1. Radial seal rings 11a, 11b, which are formed as O-rings, seal the outer races 10a, 10b off against the head housing 1.

Here, the anti-friction bearings 8a, 8b are designed as ball bearings, whose balls 12a, 12b roll inside cages (not shown) between the inner races 9a, 9b and the outer races 10a, 10b (cf. FIG. 1b).

A turbine wheel 13 is arranged in the middle in between the two antifriction bearings 8a, 8b, said turbine wheel 13 having a cylindrical hub 14 and blades 15 radially sticking out to the outside. The hub 14 of the turbine wheel 13 is non-rotatably mounted to the rotor shaft 3, here it is fixed on the shaft 3.

The turbine wheel 13 is preferably formed from one piece of metal. Annular webs 16a, 16b are formed in the area of the transition between hub 14 and blades 15. The annular webs 16a, 16b are preferably arranged axially opposite one another (FIG. 2).

The outer races 10a, 10b each extend partly into the turbine chamber 2 at opposite sides in axial direction, facing each other. In this exemplary embodiment, the outer races 10a, 10b extend approximately by a third into the turbine chamber 2 (FIG. 1a). Each annular web 16a, 16b of the turbine wheel 13 is arranged concentrically around its adjacent outer race 10a or 10b and overlaps it in the area of its axial length extending into the turbine chamber 2.

The insides of the annular webs 16a, 16b and the free outsides of the outer races 10a, 10b form gap seals 17a, 17b, which extend in axial direction between outer race 10a and annular web 16a and/or between outer race 10b and annular web 16b respectively. These non-contacting gap seals 17a, 17b seal off the rotating turbine wheel 13 against the outer races 10a, 10b of the anti-friction bearings 8a, 8b.

When the pressurized air supply is switched off, the turbine wheel 13 keeps rotating without drive and in this operational state temporarily causes a vacuum in the turbine chamber 2. Without a gap seal, it cannot be completely prevented that fluids and dirt are sucked through the rotor shaft 3 and/or along the rotor shaft 3 into the interspaces between the inner races 9a, 9b and the outer races 10a, 10b of the anti-friction bearings 8a, 8b. However, the gap seals 17a, 17b can efficiently prevent that fluids are sucked in and wander through the labyrinth of the gap seals 17a, 17b and reach the inside of the turbine chamber 2. For fluids such as particularly water, saliva or blood, the gap seals 17a, 17b have a considerably higher flow resistance than for air. That is why the gap seals 17a, 17b virtually completely prevent the undesired sucking-in of fluids and dirt when the turbine wheel keeps rotating without drive.

The second embodiment of a dental turbine as shown in FIG. 3 differs from the embodiment shown in FIG. 1 merely in that the anti-friction bearings are designed differently and in that the turbine wheel is formed slightly differently. Identical components are therefore identified by identical reference numerals.

In FIG. 3, the anti-friction bearings 20a, 20b have outer races 21a, 21b that are L-shaped in the cross section. The parts of the outer races 21a, 21b that extend into the turbine chamber 2 are bent rectangularly to the outside and thus form short radial webs 22a, 22b extending in radial direction.

The turbine wheel 23 has slightly broader annular webs 26a, 26b in the area of the transition between hub 24 and blades 25. The gap seals 27a, 27b formed by the outer races 21a, 21b and the annular webs 26a, 26b therefore extend in radial direction. These gap seals 27a, 27b, too, are highly efficient at preventing a sucking-back of contaminated fluids into the turbine chamber 2 when the turbine wheel 23 keeps rotating.

As an alternative to the embodiment shown in FIG. 3, the outer races 21a, 21b could also be configured like the outer races 10a, 10b of FIG. 1a. The annular webs 16a, 16b could be axially aligned with the outer races 10a, 10b so that gap seals 27a, 27b would be formed between the short sides of the outer races 10a, 10b and the annular webs 16a, 16b and thus also extend radially. For a satisfactory prevention of the undesired suction effect merely the radial width of the outer races and annular webs needs to be sufficiently dimensioned.

Embodiments with an L-shaped annular web are also conceivable.

Equally, embodiments are conceivable in which the annular web is arranged at or integrally formed with the rotor shaft. The annular web could also be arranged at or integrally formed with the inner race of the anti-friction bearing. In both cases, the annular web could extend radially away from the shaft; it could, for instance, be straight-lined in profile or L-shaped or T-shaped.

What is claimed is:

1. A dental turbine for driving a dental preparation tool by pressurized air, comprising:
    a head housing, inside of which a turbine chamber is formed,
    a rotor shaft that is rotatably mounted in the head housing using two coaxial anti-friction bearings arranged at an axial distance from one another and that has a chuck for receiving the preparation tool, and
    a turbine wheel that is arranged in the turbine chamber and that is non-rotatably mounted to the rotor shaft,
    wherein
    an outer race of each anti-friction bearing extends into the turbine chamber in an axial direction at opposite sides, and
    the turbine wheel is arranged between the two anti-friction bearings and has two annular webs that are positioned axially opposite one another and which are arranged concentrically to the respective outer races of the anti-friction bearings and each forms a gap seal together with the respective adjacent outer race.

2. The dental turbine according to claim 1, wherein at least one of the annular webs extends along the axial length of a part of the outer race of at least one of the anti-friction bearings that extends into the turbine chamber.

3. The dental turbine according to claim 1, wherein each annular web is integrally formed with the turbine wheel.

4. The dental turbine according to claim 1, wherein the axial length of at least one of the gap seals is multiple times larger than the distance between at least one of the annular webs and at least one of the outer races.

5. The dental turbine according to claim 1, wherein the radial distance between at least one of the annular webs and at least one of the outer races is between 0.05 mm and 0.3 mm.

6. The dental turbine according to claim 1, wherein the axial length of at least one of the gap seals is between 0.1 mm and 2.0 mm.

7. The dental turbine according to claim 1, wherein at least one of the gap seals extends in a radial direction between the outer race of at least one of the anti-friction bearings and at least one of the annular webs of the turbine wheel.

8. The dental turbine according to claim 1, wherein at least one of the gap seals is formed by the annular web and an outer surface of the outer race.

9. A dental preparation instrument which comprises a preparation tool, and a dental turbine according to claim 1.

* * * * *